United States Patent

Thomas et al.

[15] 3,681,468

[45] Aug. 1, 1972

[54] PROCESS FOR THE PRODUCTION OF HALOGENATED ALCOHOLS

[72] Inventors: Robert M. Thomas; Robert P. Levek, both of W. Lafayette, Ind.

[73] Assignee: Great Lakes Chemical Corporation, West Lafayette, Ind.

[22] Filed: March 17, 1970

[21] Appl. No.: 20,404

[52] U.S. Cl. ................................................. 260/633
[51] Int. Cl. ............................................. C07c 31/34
[58] Field of Search ..................................... 260/633

[56] References Cited

UNITED STATES PATENTS

| 3,283,013 | 6/1966 | Rimmer | 260/633 |
| 3,378,593 | 4/1968 | Jenkner et al. | 260/633 |
| 3,268,597 | 8/1966 | Clemons et al. | 260/633 |

FOREIGN PATENTS OR APPLICATIONS

| 1,132,034 | 10/1968 | Great Britain | 260/633 |
| 1,492,303 | 7/1967 | France | 260/633 |
| 1,230,412 | 12/1966 | Germany | 260/633 |

*Primary Examiner*—Howard T. Mars
*Attorney*—Gordon W. Hueschen and Talivaldis Cepuritis

[57] ABSTRACT

An improved process for the production of a halogenated alcohol from an unsaturated alcohol and bromine which involves reacting the alcohol and bromine in aqueous lithium bromide of particular concentration, separating the product from the reaction medium, removing entrained lithium bromide from the product, and recycling the lithium bromide to the reaction.

11 Claims, No Drawings

PROCESS FOR THE PRODUCTION OF HALOGENATED ALCOHOLS

This invention pertains to an improved process of producing a brominated alcohol from bromine and an unsaturated alcohol, and is especially concerned with an improved method of making 2,3-dibromo-1-propanol by the reaction of bromine and allyl alcohol in the presence of aqueous lithium bromide of a particular concentration range.

BACKGROUND OF THE INVENTION

The brominated alcohols obtained by the process of this invention are intermediates useful, when reacted with phosphorous oxychloride, in the preparation of flame retardants as described in the U.S. Pat. No. 3,268,597.

It is already known to produce a number of these dibrominated alcohols by the reaction of bromine and an unsaturated alcohol. In particular it is well known to produce 2,3-dibromo-1-propanol by the reaction of bromine and allyl alcohol (U.S. Pat. Nos. 3,268,597; 3,283,013; 3,378,593 and German Pat. No. 1,089,743). It is also known that lithium bromide (LiBr) is a material which can be present in the reaction medium and which enters into the reaction to reduce formation of 1,2,3-tribromopropane, HBr, and other by-products (see U.S. Pat. No. 3,283,013). Metal chlorides have also been added into a reaction between chlorine and allyl alcohol in the production of 2,3-dichloro-1-propanol, ostensibly to permit higher yields and reduce formation of undesired 1,2,3-trichloropropane and other by-products (British Pat. No. 570,374). Similar procedures are known wherein other materials are added to the reaction for purposes of reducing the formation of undesirable by-products, for example, to reduce formation of undesired 1,2,3-tribromopropane and HBr in a reaction between bromine and allyl alcohol. Such materials include basic oxides, neutral or acid carbonates, salts of lower fatty acids, and basic ion exchangers (German Pat. specification No. 1,089,743). All of these added materials enter into the reaction in one way or other to reduce the formation of 1,2,3-tribromopropane, HBr, and other by-products and thereby permit more advantageous production of 2,3-dibromo-propan-1-ol from the reaction between bromine and allyl alcohol. Where LiBr has been used for such purpose previously, it has been used in relatively dilute organic solutions. (See U.S. Pat. No. 3,283,013.) Reported yields have been ninety percent (90 percent) of the desired 2,3-dibromo-1-propanol. The LiBr solution suggested in U.S. Pat. No. 3,283,013 is an organic solution, for example, a carbon tetrachloride solution, which is specifically exemplified. Polar solvents having hydroxyl groups, which include water, are specifically excluded as undesirable because of reactions with bromine or intermediates in the bromination reaction, or because these polar solvents have been suspected of causing reaction between other solvents and bromine or intermediates in the bromination reaction. (U.S. Pat. No. 3,283,013, column 3, line 31.) Where aqueous solutions have been employed in an analogous reaction, yields of desired 2,3-dichloro-1-propanol have been considerably lower, on the order of 40–50 percent, presumably because of the formation of undesired by-products. (See Example II, British Pat. No. 570,374.)

The non-aqueous process with its obvious advantages previously disclosed in the art has therefore appeared as a superior and advantageous replacement for the aqueous process.

It has now been found that still greater advantages, and especially advantages of further increased yields and purer product, are attainable by the employment of aqueous LiBr solutions having a particular range of concentration, about 45–65 percent aqueous LiBr solutions, which are introduced into the reaction between the bromine and allyl alcohol in the usual manner. However, in the present process the desired 2,3-dibromo-1-propanol product is separated from the aqueous phase of the reaction and LiBr entrained or contained therein is removed, as by washing with water, to give a relatively dilute LiBr solution. The product may then be further treated as by distillation or vacuum drying to provide the product in finally purified form. The relatively dilute aqueous LiBr solution, on the other hand, is then concentrated to a concentration within the desired range, about 45–65 percent, and returned or recycled to the reaction zone.

When operating according to this procedure, which has not previously been suggested by the prior art, involving a specified concentration of aqueous LiBr solution, recovery of LiBr from the organic product as by washing with water, concentration of the thus-obtained LiBr solution, and recycling thereof into the reaction, unprecedented yields of the desired 2,3-dibromo-1-propan-1-ol are obtained. The desired product is moreover obtained in this matter in such a high yield and purified state that it can, if necessary or desirable, be further purified in an extremely simple manner, as by vacuum drying.

The provision of a process having the foregoing procedural steps and providing the foregoing enumerated advantages is accordingly an object of the present invention.

Other objects and advantages of this invention will become apparent hereinafter and still others will be obvious to one skilled in the art.

SUMMARY OF INVENTION

This invention contemplates an improved process of preparing alcohols by the simultaneous addition of bromine and an unsaturated alcohol, diol, or polyol, including triols and the like, having at least three carbon atoms, preferably three to seven carbon atoms, inclusive, to a 45–65 percent aqueous lithium bromide solution in a reaction zone at a temperature of about 20° to 80° C. to provide a resulting brominated product which is insoluble in the aqueous lithium bromide phase. The brominated alcohol product is separated from the aqueous reaction medium and entrained lithium bromide removed therefrom, preferably by washing with water. The lithium bromide solution, preferably including the wash, is then concentrated to the extent necessary to attain a concentration of about 45–65 percent aqueous lithium bromide and recycled to the reaction zone together with starting unsaturated alcohol and bromine. The brominated alcohol is further purified, as by distillation, but is usually sufficiently pure that it can be finally purified using only vacuum drying.

DESCRIPTION OF PREFERRED EMBODIMENTS

I. Reactants

The starting alcohols, diols, and polyols contemplated for use in producing brominated alcohols in this invention are water-soluble alcohols, preferably of the allylic type having three to seven carbon atoms, preferably three to four carbon atoms, inclusive, and most preferably 3-carbon atoms, such as 2-buten-1,4-diol; 3-butyn-1,2-diol; 2-butyn-1,4-diol; 3-butyn-1,2Diol; 2-propyn-1-ol; 2-propen-1-ol; 2-methyl- 2-propen-1-ol4-pentene-1,2,3-triol; 4-hexene-1,2,3-triol; 2-hydroxymethyl-2 1-ol; 2-buten-1-ol; 3-buten-1-ol; and 4-penten-2-ol. In the preferred embodiment the unsaturated alcohol is 2-propen-1-ol, commonly known as allyl alcohol. The alcohols used in the process of this invention can be commercial grade material. The reaction medium of this invention is relatively insensitive to traces of water present in the commercial grade alcohols. In like manner the bromine and lithium bromide used in the process of this invention can be commercial grade reactants and need not be specially purified or prepared.

II. Operative Limits

A. Reaction Temperature—Operating temperatures for the reaction of this invention are usually between about 20°–80° C. with the preferred operating range being about 30°–60° C. A slightly better quality product can frequently be obtained by operating at temperatures lower than 30° C., but at such temperature viscosity and heat transfer problems increase to such a point that they sometimes become a limiting factor. It is preferred to increase the operating temperatures as the concentration of the LiBr solution is increased. The rate of production of product is dramatically increased at temperatures between 60° C. and 80° C. However, entrainment and solubility of lithium bromide solution in the brominated product also increases as the temperature increases.

B. Alcohol:Lithium Bromide Ratio—Concentration of alcohols in the lithium bromide solution is usually kept as low as possible since the alcohols, which include both the starting material and final product, can react to form undesirable by-products, which are more highly brominated products, such as 1,2,3-tribromopropane, HBr, and also alcohol ethers. One side reaction by which undesired high-boiling alcohol ethers is formed has the following reaction sequence.

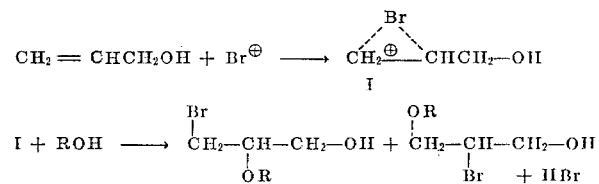

It is therefore desirable to supress formation of HBr in the reaction. It is one finding of this invention that HBr production is effectively curtailed by the employment of a concentrated aqueous lithium bromide solution according to the manner of the invention.

In the procedure of the present invention, the alcohol and bromine are simultaneously added to a reaction zone containing aqueous concentrated lithium bromide, the reaction product formed is removed, preferably neutralized and washed, and the recovered lithium bromide is concentrated and recycled to the reaction zone. The product can be purified in usual manner, but if aqueously washed free of lithium bromide, can be purified either by distillation or vacuum drying.

It is preferred that the unsaturated alcohol and bromine are added at approximately the same rate so that all the alcohol substantially reacts on addition. This maintains a low ratio of alcohol to lithium bromide in the solution. As the concentration of alcohol builds up in the lithium bromide solution, the amount of HBr produced also increases, thereby reducing the ultimate yield and purity of the product. The alcohols which affect the reaction include the 2,3-dibromopropan-1-ol product, since it is itself an alcohol. It is therefore naturally preferred that the product be removed as soon and completely as possible so as to maintain a low ratio of total alcohols to lithium bromide. Under most preferred operating conditions, it is not advisable to have a total alcohol concentration of more than 15 percent. Under optimum conditions all final product, except the amount soluble in the medium, is removed from the lithium bromide and the product removed is substantially pure product containing only minor amounts of lithium bromide which are soluble in the product. In those reactions wherein allyl alcohol is a reactant, it has been found that about 2–4 percent (w/w) of 2,3-dibromopropan-1-ol is soluble in the aqueous lithium bromide medium. However, in actual practice, an amount of product and starting material amounting in total, including dissolved product, even up to 25 percent by weight of the medium can be and frequently is entrained in the medium. Conse-quently, the lithium bromide solution always contains some entrained final product in addition to dissolved product necessitating separation of solution from final product for obvious reasons of economy. In addition, a certain amount of lithium bromide solution becomes entrained in the final product and must be removed therefrom. This can most effectively be accomplished by aqueously washing the final product. The aqueous lithium bromide wash recovered in this step is usually concentrated and returned to the reaction zone along with fresh aqueous lithium bromide.

C. Water:Lithium Bromide Ratio—As stated, the formation of HBr should be limited to prevent formation of undesired by-products. Low ratios of lithium bromide to water fail to prevent side reactions and lead to competitive reactions. Formation of HBr is suppressed when the concentration of the aqueous lithium bromide is at least 45 percent (w/w). Concentrations of aqueous lithium bromide as high as 70 percent can be used, but high concentrations require higher operating temperatures. It is therefore preferred to use a concentration of about 45–65 percent and most preferably a concentration of 50–60 percent (w/w) aqueous lithium bromide. At a concentration of 55 percent or higher, the formation of HBr is negligible and therefore produces substantially no side reactions. The concentrated aqueous lithium bromide solution, because of its extremely high affinity for bromine, allows ionic bromination to be carried out at temperatures above the boiling point of bromine (b.p. 58.8° C.) with negligible losses of bromine due to volatilization. In addition, the liquid reaction medium with a low vapor pressure and low freezing point permits ease of handling in separation and recycling procedures. Table I shows the physical properties of some concentrated solutions of lithium bromide.

TABLE I

Physical Properties of Aqueous Lithium Bromide Solutions

| % (w/w)LiBr | b.p. °C. | f.p. °C. |
|---|---|---|
| 55 | 141 | −10 |
| 60 | 152 | 10 |
| 70 | 180 | 60 |

The aqueous lithium bromide medium is moreover relatively insensitive to traces of water present in commercial starting material and also relatively hydrolytically stable during the reaction and recovery operations, whereas certain other hydrolytically stable inorganic bromides are not sufficiently soluble in water so as to form comparable bromide concentrations and yet remain in the form of a liquid under operating conditions.

Recycled aqueous lithium bromide reaction medium which has passed through the reaction zone at least once provides a higher yield of desired product with less formation of undesirable by-products than a fresh stock of the aqueous medium. In the practice of the invention, the aqueous lithium bromide reaction medium, after start-up, is substantially recycled material to insure highest yields and purest product.

D. Bromine:Alcohol Ratio—The process can be operated using substantially equimolar quantities of bromine and unsaturated alcohol. Purification of the product is simplified by carrying out the process using an excess of alcohol in an amount of 1–5 mole percent relative to the amount of bromine employed.

The process can be operated as a batch, semi-continuous, or continuous process. Preferably the process is carried out as a continuous process which operates in the following manner to produce 2,3-dibromopropan-1-ol from allyl alcohol.

A reaction zone is charged with a 45–65 percent (w/w) aqueous lithium bromide and maintained at 50°–60 C. Bromine and allyl alcohol are added simultaneously to the reaction zone. The allyl alcohol can be added dissolved in recycled stock of aqueous lithium bromide medium. The 2,3-dibromopropan-1-ol is only slightly soluble in the lithium bromide reaction medium and therefore immediately forms a separate layer which is constantly removed from the aqueous medium. The crude product is transferred to a washing zone wherein lithium hydroxide or lithium carbonate is added, together with water wash, to neutralize traces of HBr. The wash water is in the amount of approximately 10 percent (w/w) based on crude product. This results in a total recovered lithium bromide solution of approximately 30 percent (w/w) concentration. The dilute lithium bromide solution is then concentrated to 45–65 percent LiBr by weight and recycled to the reaction zone. The crude product is further worked up by known procedure. The purification can be by distillation, as is well-known in the art, or by vacuum drying techniques. Because of the uniquely pure product produced by the present process, the vacuum drying technique is ordinarily sufficient to prepare an extremely pure product.

Having generally described the process of the invention, the following examples are presented as illustrative of the best mode contemplated by the inventors for carrying out the invention. These examples are not to be construed as limiting.

EXAMPLE 1

Allyl alcohol (58.7 g., 1.01 mole, commercial grade) and 159.8 g. (1.00 mole) of bromine are simultaneously added with agitation to 800 ml. of 60 percent (w/w) aqueous lithium bromide solution at a reaction temperature of 35°–40° C. The aqueous lithium bromide solution is prepared by dissolving anhydrous lithium bromide in water to the desired concentration.

After the simultaneous addition is complete, agitation is stopped and the organic phase (bottom layer) is separated from the reactor. A quantity of freshly prepared 60 percent (w/w) lithium bromide solution (25 g.) is then added to the reactor to replace aqueous lithium bromide medium lost by solubility and entrainment in the organic phase. A second charge of bromine and allyl alcohol is then added as above and the procedure repeated. This procedure of simultaneous addition of bromide and allyl alcohol, separation of organic phase, and replenishment of aqueous lithium bromide medium is repeated until a total of 21 moles of bromine are reacted. The total amount of 60 percent (w/w) lithium bromide added is 500.0 g. lithium bromide solution per 5,160.6 g. of crude organic phase.

The fractions of separated organic phase of the above processes are combined and washed with two portions of water equalling 10 percent (w/w) of the organic charge. The first wash is neutralized to a pH of 7 by the addition of lithium carbonate. The washed neutralized 2,3-dibromopropan-1-ol is dried in vacuo at 80° C. at 11 mm. pressure for twenty minutes.

Analytical data on vacuum-stripped material:
2,3-dibromopropan-1-ol, 99.8% (determined by vapor phase chromatography assay (VPC)
1,2,3-tribromopropane, 0.07% (VPC)
Acid Number—< 0.03
APHA—90
Micro-analysis: Bromine:
  Theory: 73.3%
  Found: 73.6%
High-boiling residue (residue remaining on distillation of an aliquot at 80° C./0.1–0.4 mm) 0.7%
Water (w/w) 0.08%
Hydroxyl number 255
Yield — (Stripped only product) 95.5% based on allyl alcohol Distillation of an aliquot of the washed and neutralized 2,3-dibromopropan-1-ol produces a colorless product of the following assay:
2,3-dibromopropan-1-ol : 99.9% (VPC)
Acid Number—< 0.02
Water—0.01% (w/w)
High boiling residue—negligible
Hydroxyl number—257
Yield based on allyl alcohol—94.7%

EXAMPLE 2

The process described in Example 1 is repeated except that the two portions of wash water derived from the purification of the crude product in Example 1 are combined and concentrated in vacuo to provide a reconcentrated lithium bromide solution containing 62 percent (w/w) lithium bromide (determined by Mohr titration, sp. gr. 1.77 (22° C.)) and this recycled lithium bromide solution is used as make-up in the manner described in Example 1 instead of fresh 60 percent (w/w) lithium bromide.

Analytic data: After vacuum drying product:
2,3-dibromopropanol — 99.7% (VPC Assay)
Tribromopropane — 0.08% (VPC Assay)
Acid Number — < 0.03
Water — 0.05% (w/w)
APHA — 90
High boiling residue - 0.7% (w/w)
Hydroxyl No. — 255
Yield (vacuum stripped only) - 97.5% based on allyl alcohol.

According to this procedure, the use of recycled lithium bromide solution provides a 2 percent or better increase in yield with no loss in purity of product. By means of this process, using a concentrated lithium bromide solution as the reaction medium and recycling the lithium bromide solution, a "crude" product is obtained which contains less than 1 percent organic contaminates and may be purified to a grade of product useful as an intermediate by simple vacuum drying technique.

EXAMPLE 3

Examples 1 and 2 illustrate a semi-continuous process. The process can be operated in a continuous manner by continuously removing the organic phase and continuously adding fresh bromine and allyl alcohol. In a continuous process there is a greater amount of reaction medium entrained with the "crude" product. This entrained medium is separated in a separator before the "crude" product is processed as described above. Separated medium and lithium bromide solution retrieved from the wash step are concentrated and continuously added to the reactor to maintain a substantially constant level in the reactor.

EXAMPLE 4

The process is operated in a batchwise manner by adding the reagents in the total amount specified in Example 1 to a vessel. The reaction mass is agitated for 15 minutes and then diluted with water (about 10 percent w/w based on organic phase). The reaction mass is neutralized with lithium hydroxide to a pH of 7. The organic phase is removed and the aqueous phase containing approximately 30 percent (w/w) lithium bromide is concentrated in vacuo to 60 percent (w/w) lithium bromide and reused for subsequent batches. It is recognized that some control over the total alcohol/LiBr solution ratio is sacrificed by operating in a batchwise manner, but in such operation the product obtained by using recycled LiBr as the medium is nevertheless characterized by higher yields than the product obtained from fresh LiBr solution, although not as pure as in a continuous or semi-continuous process where the alcohol/LiBr ratio can be kept lower and more carefully maintained.

It is to be understood that the invention is not to be limited to the exact details of operation or procedures shown and described, and the invention is therefore to be limited only by the full scope of the appended claims.

What we claim is:

1. In a process for the preparation of a brominated alcohol by the reaction of bromine and an unsaturated alcohol selected from the group consisting of water-soluble monohydroxy and polyhydroxy alkenes and alkynes having 3–7 carbon atoms inclusive, the improvement comprising the steps of concurrently adding bromine and said unsaturated alcohol to an about 45–65 percent aqueous solution of lithium bromide at a temperature of about 20°–80° C., separating brominated alcohol product from the lithium bromide solution and recovering the same, and reusing said lithium bromide solution in a subsequent reaction of the same kind.

2. A process according to claim 1 wherein said separated lithium bromide solution is concentrated to the extent necessary to attain an about 45–65 percent lithium bromide concentration.

3. A process according to claim 1 comprising separating brominated alcohol, as an organic phase, from lithium bromide solution, as an aqueous phase, aqueously washing said organic phase to remove remaining lithium bromide, recovering brominated alcohol from said aqueous wash, concentrating said aqueous phase including aqueous wash to a lithium bromide concentration of about 45–65 percent, and returning said concentrated lithium bromide solution to the reaction zone with starting unsaturated alcohol and bromine.

4. A process according to claim 3 wherein the alcohol is allyl alcohol.

5. A process according to claim 4 wherein the reaction temperature is about 30°–60° C.

6. A process according to claim 1 wherein the concentration of lithium bromide in the aqueous solution is about 50–60 percent.

7. A process according to claim 6 wherein the allyl alcohol added is in 1–5 mole percent excess relative to the amount of bromine added.

8. A process according to claim 1 which comprises continuously and simultaneously adding bromine, allyl alcohol, and aqueous lithium bromide solution to a reaction zone maintained at 30°–60° C. and containing a 50–60 percent aqueous lithium bromide solution, continuously removing the 2,3-dibromopropan-1-ol organic phase formed, aqueously washing said organic phase and recovering dilute aqueous lithium bromide and 2,3-dibromopropan-1-ol from said wash, concentrating said recovered aqueous lithium bromide to a 50–60 percent lithium bromide solution, and returning said recovered aqueous lithium bromide to the reaction zone in an amount sufficient to maintain a substantially constant volume of lithium bromide solution therein.

9. A process according to claim 8 wherein the allyl alcohol is added in 1–5 mole percent excess relative to the amount of bromine added.

10. A process according to claim 8 wherein the 2,3-dibromopropan-1-ol removed from the reaction medium is neutralized with lithium hydroxide or lithium carbonate.

11. A process according to claim 10 wherein the recovered 2,3-dibromopropan-1-ol is purified by vacuum drying.

* * * * *

UNITED STATES PATENT OFFICE
CERTIFICATE OF CORRECTION

Patent No. 3,681,468                    Dated August 1, 1972

Inventor(s) Robert M. Thomas and Robert P. Levek

It is certified that error appears in the above-identified patent and that said Letters Patent are hereby corrected as shown below:

Column 3, lines 8, 9 and 10 should read as follows:

-- 1,2-diol; 2-propyn-1-ol; 2-propen-1-ol; 2-methyl-2- propen-1-ol; 4-pentene-1,2,3-triol; 4-hexene-1,2,3-triol;

2-hydroxymethyl-2-propen-1-ol; 2-buten-1-ol; 3-buten- --.

Signed and sealed this 9th day of January 1973.

(SEAL)
Attest:

EDWARD M. FLETCHER, JR.                 ROBERT GOTTSCHALK
Attesting Officer                       Commissioner of Patents